United States Patent
Lee

(10) Patent No.: US 8,994,328 B2
(45) Date of Patent: Mar. 31, 2015

(54) ELECTRIC VEHICLE, ELECTRIC-VEHICLE CHARGING STAND AND COMMUNICATION SYSTEM THEREBETWEEN

(75) Inventor: Chung woo Lee, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 741 days.

(21) Appl. No.: 13/241,135

(22) Filed: Sep. 22, 2011

(65) Prior Publication Data

US 2012/0200258 A1 Aug. 9, 2012

(30) Foreign Application Priority Data

Feb. 8, 2011 (KR) .......................... 10-2011-0011228

(51) Int. Cl.
*H02J 7/00* (2006.01)
*B60L 11/18* (2006.01)

(52) U.S. Cl.
CPC ......... *B60L 11/1825* (2013.01); *B60L 11/1838* (2013.01); *H02J 7/0004* (2013.01); *Y02T 10/7005* (2013.01); *Y02T 90/16* (2013.01); *Y02T 90/163* (2013.01); *Y02T 90/14* (2013.01); *Y02T 90/128* (2013.01); *Y02T 90/121* (2013.01)
USPC ........... 320/109; 320/104; 320/132; 320/152; 320/156

(58) Field of Classification Search
CPC ........................................................ H02J 7/00
USPC .......................................................... 320/109
See application file for complete search history.

(56) References Cited

U.S. PATENT DOCUMENTS

| 8,541,978 B2 * | 9/2013 | Fukuo et al. .................. 320/109 |
| 2007/0126395 A1 * | 6/2007 | Suchar .......................... 320/109 |
| 2010/0327878 A1 * | 12/2010 | Ishikawa et al. .............. 324/537 |

FOREIGN PATENT DOCUMENTS

| JP | 2010-142087 | 6/2010 |
| KR | 10-1995-0021941 | 7/1995 |

* cited by examiner

*Primary Examiner* — Edward Tso
*Assistant Examiner* — Ahmed Omar
(74) *Attorney, Agent, or Firm* — Lee, Hong, Degerman, Kang & Waimey

(57) ABSTRACT

Disclosed are an electric vehicle (EV), an EV charging stand, and a communication system therebetween, the EV including a charge control unit configured to detect a preparation state for charging a battery and output a resistance varying signal according to the detected state, and a resistor unit configured to vary a resistance value in response to the resistance varying signal, thus changing a voltage value of a state signal transmitted to the EV charging stand, and the EV charging stand including a comparator configured to receive a stage signal from the EV, compare a voltage value of the received state signal with a reference value, and output a signal in response to a result of comparing, and a control unit configured to receive the signal from the comparator and detect a preparation state for charging the battery of the EV.

8 Claims, 1 Drawing Sheet

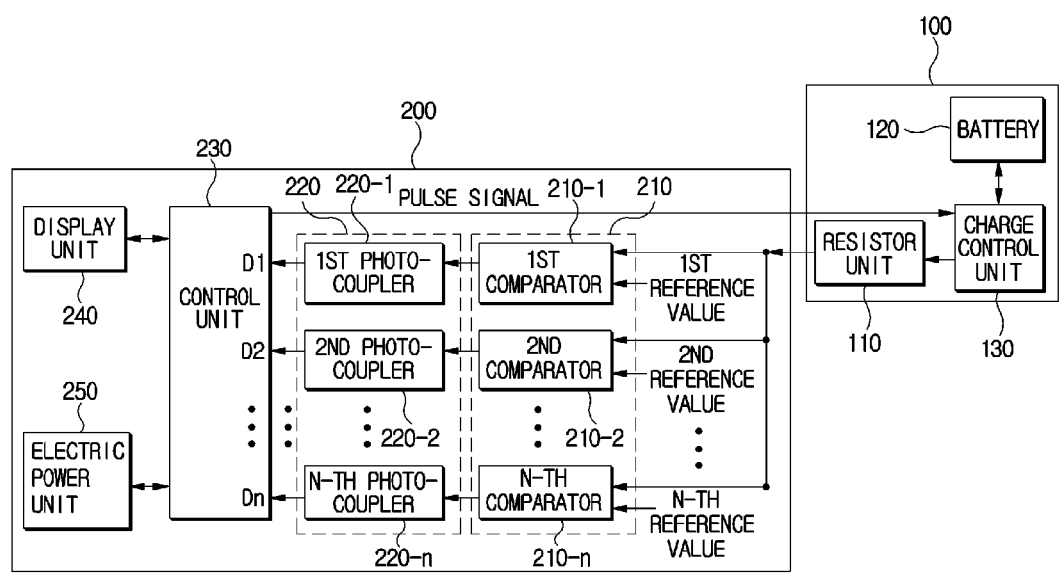

ELECTRIC VEHICLE, ELECTRIC-VEHICLE CHARGING STAND AND COMMUNICATION SYSTEM THEREBETWEEN

CROSS-REFERENCE TO RELATED APPLICATIONS

Pursuant to 35 U.S.C. §119(a), this application claims the benefit of earlier filing date and right of priority to Korean Patent Application No. 10-2011-0011228, filed on Feb. 8, 2011.

BACKGROUND OF THE INVENTION

1. Field of the Invention

The present invention relates generally to an electric vehicle, a charging stand and a communication system therebetween and, more particularly, to an electric vehicle, a charging stand and a communication system therebetween, configured to more precisely determine a charge preparation state of the electric vehicle before a battery of the electric vehicle is charged.

2. Description of the Related Art

As fossil energy is being exhausted and environmental pollution becomes serious in recent years, an interest in an electric vehicle using electric energy in place of the fossil energy or a hybrid vehicle is increasing, whereby research into the electric vehicle or the hybrid vehicle is being actively carried out. The electric vehicle or the hybrid vehicle requires electric energy to drive a motor of the vehicle, and the electric energy is supplied through a battery.

The battery for the electric vehicle or the hybrid vehicle largely uses a secondary battery that may repeat a discharging operation converting chemical energy into electric energy and a charging operation converting electric energy into chemical energy. The secondary battery includes a nickel-cadmium battery, a nickel-hydride battery, a lithium-ion battery, a lithium-ion polymer battery, etc. Such a secondary battery is classified into a lithium-based battery and a nickel-hydride-based battery. The lithium-based battery is largely applied to a small product, such as a digital camera, a P-DVD, an MP3P, a mobile phone, a PDA, a portable game device, a power tool or an E-bike, while the nickel-hydride-based battery is largely applied to a large product requiring a high output, such as an electric vehicle or a hybrid vehicle. Korean government made a statement about a plan for mass production of an electric vehicle in 2011. Thus, a rapid increase in demand for the electric vehicle is expected.

Meanwhile, the electric vehicle may be charged in a parking lot of a workplace or home as well as a charging station. Since the electric vehicle is driven using electric energy stored in the battery, the battery must be frequently charged during travel. Thereby, it is especially important to safely and precisely perform a battery charging operation between the electric vehicle and an EV charging stand. To this end, a communication system is required to precisely transceive information on whether a charge preparation step has been successfully performed before a battery charging operation is performed between the charging stand and the electric vehicle.

SUMMARY OF INVENTION

Accordingly, an object of the present invention is to provide an electric vehicle, a charging stand and a communication system therebetween, configured to more precisely determine a charge preparation state of the electric vehicle before a battery of the electric vehicle is charged with electricity.

In order to accomplish the object, there is provided an electric vehicle according to an embodiment of the present invention, the electric vehicle comprising: a charge control unit configured to detect a preparation state for charging a battery of the electric vehicle with electricity and to output a resistance varying signal according to the detected preparation state, and a resistor unit configured to vary a resistance value in response to the resistance varying signal outputted from the charge control unit, thus changing a voltage value of a state signal transmitted to a charging stand of the electric vehicle.

Further, there is provided an EV charging stand according to an embodiment of the present invention, the charging stand comprising: a comparator configured to receive a stage signal from a resistor unit of an electric vehicle, to compare a voltage value of the received state signal with a reference value, and to output a signal in response to a result of comparing, and a control unit configured to receive the signal from the comparator and to detect a preparation state for charging the battery of the electric vehicle.

The comparator is configured to compare the voltage value of the state signal received from the resistor unit with the reference value, and to thereby output a 'Low' signal when the voltage value of the state signal is lower than the reference value and output a 'High' signal when the voltage value of the state signal is higher than the reference value.

The EV charging stand further includes a photo-coupler configured to electrically insulate the comparator from the control unit and to transmit a signal from the comparator to the control unit. The control unit is configured to detect a preparation state for charging the battery of the electric vehicle, in response to the signal received from the photo-coupler.

In the present invention, the control unit is configured to detect the preparation state for charging the battery of the electric vehicle in response to the received signal, and to control an operation of an electric power unit supplying a current for charging the battery to the electric vehicle connected to the EV charging stand, based on the detected preparation state. Further, the control unit is configured to control a display unit so that the detected preparation state is displayed in the display unit provided in the EV charging stand.

The electric vehicle, the charging stand, and the communication system therebetween according to the present invention enable the charge preparation state of the electric vehicle to be more precisely determined before the battery of the electric vehicle is charged with electricity.

BRIEF DESCRIPTION OF THE DRAWINGS

FIG. 1 is a block diagram illustrating a configuration of a communication system between an electric vehicle and a charging stand, in accordance with a preferred embodiment of the present invention.

DETAILED DESCRIPTION OF THE INVENTION

It should be understood that the embodiment shown in the accompanying drawing is for illustrative purposes only. Further, the embodiment is provided for the purpose of most easily describing the principle and concept of the present invention.

FIG. 1 is a block diagram illustrating a configuration of a communication system between an electric vehicle 100 and a charging stand 200, in accordance with a preferred embodiment of the present invention. As shown in FIG. 1, the EV charging stand 200 is configured to have a plurality of comparators 210 and a plurality of photo-couplers 220. However, if necessary, the EV charging stand 200 may be configured to have one comparator 210-n and one photo-coupler 220-n. Here, the two configurations are different from each other in number of components provided in the EV charging stand 200, but are equal to each other in operation of the comparator 210-n and the photo-coupler 220-n.

The communication system of the present invention includes the electric vehicle 100 and the EV charging stand 200. The electric vehicle 100 includes a charge control unit 130 and a resistor unit 110, and the EV charging stand 200 includes a comparator 210-n, a photo-coupler 220-n and a control unit 230. Further, as described above, a plurality of comparators 210 and a plurality of photo-couplers 220 may be provided as shown in FIG. 1.

Hereinafter, operation of the respective components will be described.

The charge control unit 130 of the electric vehicle 100 detects a preparation state for charging the battery 120 of the electric vehicle 100 with electricity, using various motion sensors (not shown) provided in the electric vehicle 100, and generates and outputs a resistance varying signal based on the detected state. At this time, the charge control unit 130 of the electric vehicle 100 is operated in response to a pulse signal transmitted from the control unit 230 of the EV charging stand 200, as a synchronizing signal. That is, the charge control unit 130 of the electric vehicle 100 may be synchronized with the control unit 230 of the EV charging stand 200 via the pulse signal.

The resistor unit 110 changes a resistance value in response to a resistance varying signal outputted from the charge control unit 130, thus changing a voltage value of a state signal transmitted to the EV charging stand 200. Thereby, the voltage value of the state signal transmitted to the EV charging stand 200 is used as information indicating the preparation state for charging the EV battery 120 with electricity. However, because of errors in internal resistance of wire transmitting a state signal to the EV charging stand 200 or in resistance of the resistor unit 110, a state signal having a voltage value that falls out of a voltage-value permissible range of a state signal may be undesirably transmitted to the EV charging stand 200.

Therefore, it is undesirable to transmit a state signal to the EV charging stand 200 without additional error compensation and to determine the charge preparation state of the battery 120 of the electric vehicle 100 based on a voltage value of the state signal. In order to overcome this problem, the communication system according to the present invention is configured so that the EV charging stand 200 is provided with the comparator 210-n.

The comparator 210-n of the EV charging stand 200 is configured so that a 'Low' signal is outputted when a voltage value of a state signal received from the electric vehicle 100 is lower than a reference value, and a 'High' signal is outputted when a voltage value is higher than the reference value. Thus, as described above, even if a voltage value of a state signal slightly falls out of a range of a value showing a current charge preparation state of the battery 120 of the electric vehicle 100 because of errors in internal resistance of wire transmitting a state signal or in resistance of the resistor unit 110, the comparator 210-n is configured to input the 'High' signal into the control unit 230 of the EV charging stand 200 if a voltage value is higher than the reference voltage value, and to input the 'Low' signal into the control unit 230 if a voltage value is lower than the reference voltage value. Therefore, as compared with a configuration wherein the control unit 230 of the EV charging stand 200 detects a voltage value of a state signal and determines the charge preparation state of the battery 120 of the electric vehicle 100, the configuration having the comparator enables the state of the electric vehicle 100 to be more precisely determined.

The photo-coupler 220-n electrically insulates the comparator 210-n from the control unit 230, and transmits a signal from the comparator 210-n to the control unit 230.

The control unit 230 of the EV charging stand 200 detects the preparation state for charging the battery 120 of the electric vehicle 100, in response to a signal inputted from the photo-coupler 220-n. For example, the control unit 230 may be configured to detect that the preparation for charging the battery 120 of the electric vehicle 100 has been completed when the 'High' signal is inputted into the control unit 230. Further, the control unit 230 may be configured to perform the above detecting operation while storing information on the state of the electric vehicle in response to an input signal.

Further, when the EV charging stand 200 is configured to include a plurality of comparators 210 and a plurality of photo-couplers 220, the comparators 210 compare a voltage value of a state signal received from the electric vehicle with a plurality of reference values having different voltage values. Here, if a voltage value is lower than the reference value, a 'Low' signal is outputted. In contrast, if a voltage value is higher than the reference value, a 'High' signal is outputted. For example, assuming that reference values having different voltage values are 3V (volt), 6V, and 9V, a first reference value inputted into a first comparator 210-1 is 3V, a second reference value inputted into a second comparator 210-2 is 6V, and a third reference value inputted into a third comparator 210-3 is 9V, all of the first, second, and third comparators 210-1, 210-2, and 210-3 output 'High' signals when a voltage value of a state signal is 9V or more, and the first and second comparators 210-1 and 210-2 output 'High' signals and the third comparator 210-3 outputs a 'Low' signal when a voltage value of a state signal ranges from 6V to 9V. Further, if a voltage value of a state signal ranges from 3V to 6V, the first comparator 210-1 outputs a 'High' signal and the second and third comparators 210-2 and 210-3 output 'Low' signals.

Signals outputted through the plurality of comparators 210 may be transmitted to the control unit 230 through the plurality of photo-couplers 220 that match the comparators 210 in one-to-one correspondence.

The control unit 230 is configured to receive a plurality of signals from the comparators 210 through the photo-couplers 220. The control unit 230 is configured to store information on the charge preparation state of the battery 120 of the electric vehicle 100 for a plurality of signals D1, D2, Dn, for example, signals D1, D2 and D3 and to detect a preparation state of the electric vehicle 100 in response to signals inputted through the photo-couplers 220.

Here, information on the charge preparation state of the battery 120 of the electric vehicle 100 designates information on various preparation states, including perfect connection between a charge-current-supply connector of the EV charging stand 200 and the electric vehicle 100, completion of preparation for charging the battery 120 of the electric vehicle 100, and interruption to preparation for charging the battery 120.

Further, after the control unit 230 detects the preparation state for charging the battery 120 of the electric vehicle 100, the control unit 230 controls operation of an electric power unit 250 provided in the EV charging stand 200 to supply a current for charging the battery to the electric vehicle 100, according to the detected preparation state, thus starting or stopping the supply of the charge current from the EV charging stand 200 to the electric vehicle 100.

Further, the control unit 230 may be configured to detect the preparation state for charging the battery 120 of the electric vehicle 100, and to control a display unit 240 so that the detected preparation state is displayed in the display unit 240 provided in the EV charging stand 200.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electric vehicle (EV) charging stand, comprising:
    a plurality of comparators configured to receive a state signal from an electric vehicle (EV), to compare a voltage value of the received state signal with a reference value, and to output a plurality of signals in response to a result of the comparing, wherein each of the plurality of comparators has a different reference value; and
    a control unit configured to receive the plurality of signals outputted from the plurality of comparators, and to detect a preparation state for charging a battery of the EV.

2. The EV charging stand as set forth in claim 1, wherein the each of the plurality of comparators is configured to compare the voltage value of the state signal received from the EV with the reference value, and to output a 'Tow' signal when the voltage value of the state signal is lower than the reference value and output a 'High' signal when the voltage value of the state signal is higher than the reference value.

3. The EV charging stand as set forth in claim 1, further comprising:
    a plurality of photo-couplers configured to electrically insulate the plurality of comparators from the control unit, and to transmit the plurality of signals outputted from the comparator to the control unit.

4. The EV charging stand as set forth in claim 3, wherein the control unit is configured to detect a preparation state for charging the battery of the EV, in response to the plurality of signals received from the plurality of photo-couplers.

5. The EV charging stand as set forth in claim 1, wherein the control unit is configured to detect the preparation state for charging the battery of the EV in response to the received plurality of signals, and to control an operation of an electric power unit supplying a current for charging the battery to the EV connected to the EV charging stand, based on the detected preparation state.

6. The EV charging stand as set forth in claim 1, wherein the control unit is configured to detect the preparation state for charging the battery of the EV in response to the received plurality of signals, and to control a display unit provided in the EV charging stand so that the detected preparation state is displayed in the display unit.

7. The EV charging stand as set forth in claim 1, wherein the electric vehicle (EV) comprises:
    a charge control unit configured to detect a preparation state for charging a battery of the EV, and to output a resistance varying signal according to the detected preparation state, and
    a resistor unit configured to vary a resistance value in response to the resistance varying signal outputted from the charge control unit, thus changing a voltage value of a state signal transmitted to the EV charging stand connected to the EV when the battery is charged.

8. The EV charging stand as set forth in claim 7, wherein the charge control unit receives a pulse signal from the EV charging stand to be synchronized with the control unit of the EV charging stand.

* * * * *